United States Patent [19]

Taylor

[11] Patent Number: 5,373,864
[45] Date of Patent: Dec. 20, 1994

[54] DOWNSTREAM LOW FLUID PRESSURE EMERGENCY SHUTOFF VALVE

[76] Inventor: Julian S. Taylor, 8300 SW. 8th St., Oklahoma City, Okla. 73128

[21] Appl. No.: 195,424

[22] Filed: Feb. 14, 1994

Related U.S. Application Data

[63] Continuation-in-part of Ser. No. 921,677, Jul. 30, 1992, Pat. No. 5,318,060.

[51] Int. Cl.$^5$ .............................................. F16K 17/00
[52] U.S. Cl. ...................................... 137/67; 251/282
[58] Field of Search ............... 137/67, 461, 71, 522, 137/533.25; 251/82

[56] References Cited

U.S. PATENT DOCUMENTS

| | | | |
|---|---|---|---|
| 4,240,458 | 12/1980 | Huff | 137/461 X |
| 5,067,511 | 11/1991 | Taylor | 137/67 |
| 5,146,942 | 9/1992 | Taylor | 137/67 |
| 5,318,060 | 6/1994 | Taylor | 137/67 |

Primary Examiner—Martin P. Schwadron
Assistant Examiner—Kevin L. Lee
Attorney, Agent, or Firm—Robert K. Rhea

[57] ABSTRACT

An emergency shutoff valve for monitoring fluid and stopping fluid flow in a conductor in the event of fluid pressure decrease below a predetermined value at the downstream outlet port of a valve. The valve body contains a valve seat and a normally open valve for seating on the seat and includes opposing valve stems each slidably supported, at one end portion, by the body. The valve head is fluid pressure balanced by equal upstream and downstream valve stem cross sectional areas. A plate is secured to the body by posts in axial spaced relation with respect to the downstream outwardly projecting end portion of one valve stem for supporting a pressure collapsible rod-like pin axially interposed between the plate and the valve stem. A valve stem spring biases the valve toward its seat with the bias offset by fluid pressure against a valve stem piston on the upstream end of the valve stem. A drop in pressure against the valve stem piston assists the spring in collapsing the pin and seating the valve.

7 Claims, 2 Drawing Sheets

DOWNSTREAM LOW FLUID PRESSURE EMERGENCY SHUTOFF VALVE

This application is a continuation-in-part of an application filed by me in the United States Patent and Trademark Office on Jul. 30, 1992 under Ser. No. 07/921,677, now U.S. Pat. No. 5,318,060 for FLUID FLOW VELOCITY EMERGENCY SHUTOFF VALVE.

BACKGROUND OF THE INVENTION

1. Field of the Invention

This invention relates to fluid conductors and more particularly a valve interposed in a fluid flow line for monitoring fluid pressure.

2. Description of the Prior Art

The most pertinent patent is believed to be U.S. Pat. No. 5,067,511, issued Nov. 26, 1991 to Taylor for High Pressure Emergency Fluid Shutoff Valve.

This patent discloses a valve body having a flow passageway interposed in a fluid conducting line. A valve having a head portion substantially greater in diameter than it's stem portion is slidably supported by the valve body. The valve head is normally maintained unseated in an upstream direction by a collapsible pin axially interposed between a valve cage and the end of the valve stem opposite it's head. In the event the downstream end of the flow line is closed, pressure build up in the valve body flow passageway forces the valve closed by collapsing the pin.

This invention similarly discloses a valve body having a flow passageway interposed in a fluid flow line, in which a valve is normally maintained off it's seat by a collapsible pin interposed between a valve cage and the end of the valve stem opposite it's head and fluid pressure on a valve stem piston. In the event downstream fluid pressure decreases below a predetermined value fluid flow against the valve head in combination with a valve stem spring collapses the pin and seats the valve head to close the flow passageway.

SUMMARY OF THE INVENTION

A valve body having inlet and outlet ports forming a fluid flow passageway is interposed in a fluid conducting line. An upstream facing valve seat is formed on the body wall transversely of the flow passageway. An elongated valve stem having a head portion intermediate it's ends is slidably supported at it's respective end portions by the valve body for movement of the valve head toward and away from the seat. A piston subject to upstream pressure on the extreme end of the valve stem holds a valve head off seat. A cage attached to the valve body around the exposed downstream end portion of the valve stem supports one end of a collapsible pin axially interposed between the valve stem and the cage normally maintaining the valve in an open position. A spring interposed between the downstream end of the valve stem and the body biases the valve stem toward the pin.

The principal object of this invention is to provide a fluid pressure maintained open valve which is spring biased to a closed position by a decrease in flowing fluid pressure.

DESCRIPTION OF THE PREFERRED EMBODIMENTS

Figures 1, 3:
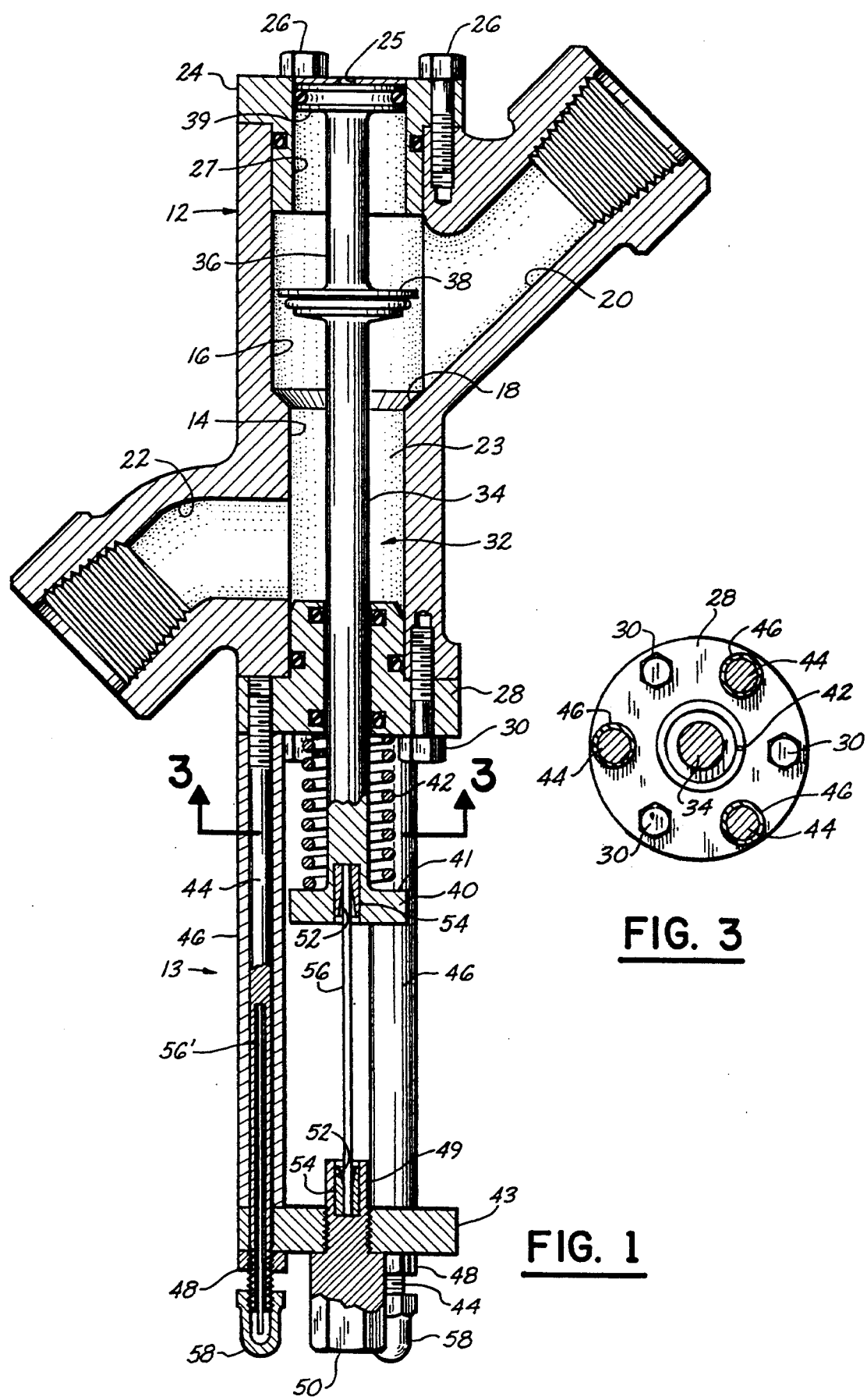
FIG. 1 is a longitudinal sectional view, partially in elevation, illustrating the valve in open position.
FIG. 3 is a transverse cross sectional view taken substantially along the line 3—3 of FIG. 1.
Figure 2:
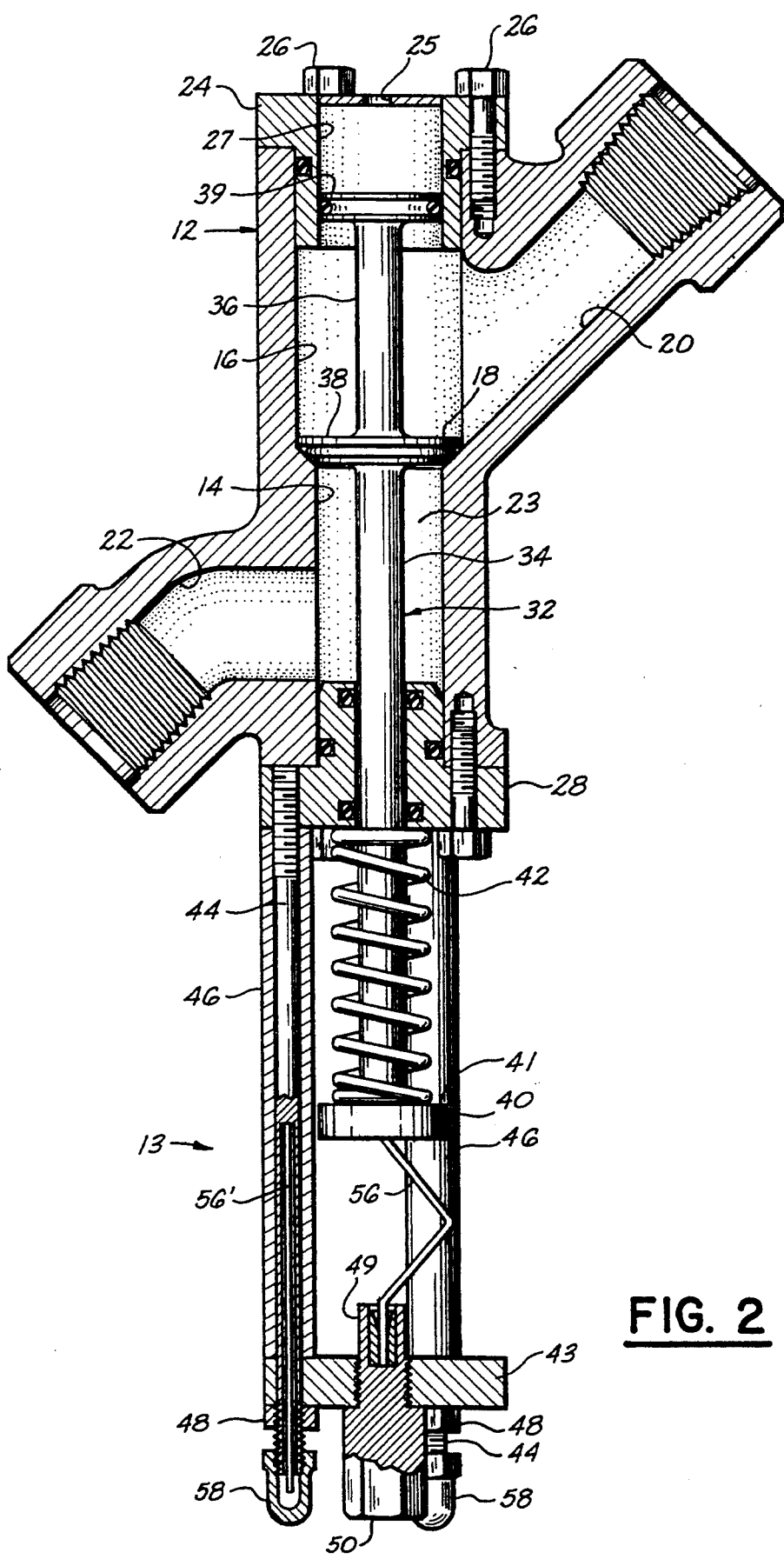
FIG. 2 is a similar view illustrating the valve in closed position.

Like characters of reference designate like parts in those figures of the drawings in which they occur.

In the drawings:

The reference numeral 10 indicates the low pressure fluid shutoff valve as a whole.

The valve comprises a body 12 having a pin cage means 13 at one end and having a through bore 14, counterbored as at 16, from its upstream end to form a valve seat 18.

The body is provided with an upstream inlet port 20 communicating with the counterbore 16 on the upstream side of the valve seat and having its axis disposed at an acute angle with respect to the longitudinal axis of the bores 14 and 16.

The body is further provided with a downstream outlet port 22 communicating with the bore 14 on the downstream side of the valve seat 18 to form a fluid passageway 23 through the valve body with the axis of the outlet port disposed in substantial alignment with the axis of the inlet port 20.

The counterbored upstream end of the body 12 is closed by a substantially T-shaped upstream end cap 24 having a central bore 25 and secured to the body by a plurality of bolts 26. The upstream cap is counterbored, as at 27, for the purpose presently explained.

Similarly, the body is closed at the downstream end of it's bore 14 by a substantially T-shaped centrally bored end cap 28, secured to the body by a plurality of circumferentially spaced bolts 30.

An elongated rod forming a valve stem 32 is axially disposed in the bores 14 and 16 and is slidably received at it's downstream end portion 34 by the bore of the body downstream end cap 28. A valve head 38 is axially interposed in the valve stem intermediate it's ends for seating and unseating on the valve seat 18. The end of the valve stem upstream end portion 36 is axially secured to a piston 39, diametrically slightly smaller than the diameter of the valve head 38, and O-ring sealed with the wall of the counterbore 27. The axial length of the counterbore 27 is at least equal with the distance between the valve head 38 and its seat 18 for the reason believed readily apparent.

Both ends of the valve stem 32 are exposed to the atmosphere. A disk 40 integrally formed axially on the end of the downstream end portion 34 of the valve stem is diametrically greater than the valve stem and forms an annular shoulder 41 supporting one end of a helical spring 42 interposed between the shoulder 41 and the end cap 28 for the purposes presently explained.

The upstream end surface of the piston 39 normally abuts the inward end of the counterbore 27 to limit upstream movement of the valve stem and position the valve head 38 in selected spaced relation with respect to the valve seat 18.

The pin cage means 13 comprises a plate 43 maintained in parallel axial spaced relation with respect to the valve stem disk 40 by a plurality of posts 44 projecting through cooperating bores in the plate 43 and threadedly engaged with the end cap 28 in radial and circumferential equally spaced relation.

A like plurality of sleeves 46 respectively surround the posts 44 and a post nut 48 is threadedly connected with the end of the respective post opposite the downstream end cap 28. The plate 43 is centrally bored and threaded for receiving the threaded end portion 49 of a step diameter pin supporting nut 50. The confronting ends of the pin holding nut 50 and the valve stem disk 40 are coaxially drilled to form sockets 52 respectively receiving pin guide inserts 54 for nesting the respective end portion of a collapsible pin 56.

Each of the posts 44 are axially drilled from their ends opposite the end cap 28 for receiving spare pins 56', which are maintained within the respective post by acorn nuts or caps 58.

Operation

The valve 10 is assembled as described hereinabove and interposed in a flow line, not shown.

The spring 42 normally biases the valve stem 32 toward a collapsed position of the pin 56 and its bias is offset by fluid pressure in the passageway 23 against the piston 39.

Fluid pressure in the passageway 23, under normal conditions, is substantially equal on the end surfaces of the valve head 38, thus, allowing the resilience of the pin 56 to maintain the valve head 38 spaced from its seat 18.

In the event of a rupture or severing the flow line downstream from the position of the valve 10, fluid flow through the downstream flow line break results in drop in pressure of the fluid, thus, lowering the outward force against the piston 39, which, aided by the expansion resilience of the spring 42, forces the valve head 38 to its seat 18, collapsing the pin 56 and interrupting fluid flow through the passageway 23.

After the problem has been corrected, the valve may be reset by manual pressure against the valve stem disk 40 moving the piston 39 to the inward end of the counterbore 27; removing the ruptured pin 56; obtaining one of the replacement pins 56' from one of the bolts 44; and, after removing the pin nut 50, inserting the replacement pin 56' in place and reinserting the pin nut 50. The piston is held open while internal fluid pressure increases until its pressure acting on piston 39 is sufficient to counteract the expansion spring force to the point the downward restraining force is removed and the pin holds piston 38 off seat.

Obviously the invention is susceptible to changes or alterations without defeating its practicability. Therefore, I do not wish to be confined to the preferred embodiment shown in the drawings and described herein.

I claim:

1. A downstream low fluid pressure emergency shutoff valve, comprising:
   an elongated valve body having a through bore and having an inlet port adjacent one end axially disposed at an acute angle with respect to the adjacent end portion of the body and having a lateral outlet port intersecting the through bore intermediate the ends of the body and forming a fluid passageway interposed in a flow line;
   a valve seat intersecting the fluid passageway at the down stream limit of the inlet port;
   normally open valve means including a valve head intermediate the ends of a valve stem slidably supported by said body for sealing with said valve seat and closing the fluid passageway;
   piston means on the upstream end of said valve stem for normally maintaining said valve head in a fluid passageway open position in response to fluid pressure in the passageway;
   spring means for biasing said valve stem in a downstream direction; and,
   axially collapsible pin means for normally maintaining said valve means in a fluid passageway open position and releasing said valve means for seating on said valve seat in response to a decrease in fluid pressure below a predetermined value at the outlet port.

2. The shutoff valve according to claim 1 in which said spring means includes:
   the downstream end portion of said valve stem projecting outwardly of the body and having an outstanding shoulder adjacent its outwardly projecting end; and,
   a spring interposed between the shoulder and the body.

3. The shutoff valve according to claim 2 in which said pin means comprises:
   pin cage means including a plate secured to said body in axial outstanding relation with respect to the outwardly projecting end portion of said valve stem; and,
   an elongated rod-like pin axially extending between said valve stem end portion and said plate.

4. The shutoff valve according to claim 3 in which said pin cage means further includes:
   a plurality of post means surrounding said pin in radially spaced relation for connecting said plate with said valve body.

5. A downstream low fluid pressure emergency shutoff valve, comprising:
   an elongated valve body having a through bore and having an inlet port adjacent one end axially disposed at an acute angle with respect to the adjacent end portion of the body and having a lateral outlet port intersecting the through bore intermediate the ends of the body and forming a fluid passageway interposed in a flow line;
   a valve seat intersecting the fluid passageway at the down stream limit of the inlet port;
   normally open valve means supported by said body for movement toward said valve seat and closing the fluid passageway, said valve means comprising:
   a valve for sealing with said seat, and,
   a valve stem axially projecting from the upstream and downstream sides of said valve;
   piston means slidable in the body on the upstream end of said valve stem for normally maintaining said valve head in a fluid passageway open position in response to fluid pressure on the piston;
   the downstream end portion of said valve stem projecting beyond and slidably supported by said body and having a shoulder adjacent its outward end;
   a spring interposed between the shoulder and the body; and,
   axially collapsible pin means for normally maintaining said valve means in a fluid passageway open position and releasing said valve means for sealing with said valve seat in response to a decrease in fluid pressure below a predetermined value at the outlet port and on the piston.

6. The shutoff valve according to claim 5 in which said pin means comprises:

pin cage means including a plate secured to said body in axial outstanding relation with respect to the downstream end portion of said valve stem; and, an elongated rod-like pin axially extending between said valve stem downstream end portion and said plate.

7. The shutoff valve according to claim 6 in which said pin cage means further includes:

a plurality of post means surrounding said pin in radially spaced relation for connecting said plate with said valve body.

* * * * *